(12) United States Patent
Oda et al.

(10) Patent No.: US 7,556,457 B2
(45) Date of Patent: Jul. 7, 2009

(54) DRILLING SYSTEM INCLUDING DRILLING MACHINE AND COMPRESSOR

(75) Inventors: Hiroyuki Oda, Hitachinaka (JP); Yukio Terunuma, Hitachinaka (JP); Masayuki Ogura, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 479 days.

(21) Appl. No.: 11/055,486

(22) Filed: Feb. 11, 2005

(65) Prior Publication Data

US 2005/0186041 A1 Aug. 25, 2005

(30) Foreign Application Priority Data

Feb. 19, 2004 (JP) ............................ P2004-042273

(51) Int. Cl.
*B23B 51/06* (2006.01)
(52) U.S. Cl. ................ 408/6; 408/9; 408/57; 408/124; 175/217; 173/75
(58) Field of Classification Search .................. 408/56, 408/59, 6, 8, 9, 10, 11, 16, 57, 60, 63, 124, 408/130, 702, 61; 409/135, 136; 175/207, 175/209, 211, 212, 217, 218; 173/75; *B28D 1/14*
See application file for complete search history.

(56) References Cited

U.S. PATENT DOCUMENTS

| | | | | |
|---|---|---|---|---|
| 2,869,403 A | * | 1/1959 | Bent ............................ 408/130 |
| 3,179,184 A | * | 4/1965 | Jackson .......................... 173/3 |
| 3,294,182 A | * | 12/1966 | Filander et al. ................ 173/77 |
| 3,546,976 A | * | 12/1970 | Urda et al. ..................... 408/59 |
| 4,076,442 A | * | 2/1978 | Cox et al. ........................ 408/8 |
| 4,529,340 A | * | 7/1985 | O'Dell ......................... 408/1 R |
| 4,752,161 A | * | 6/1988 | Hill .............................. 408/67 |
| 5,006,021 A | * | 4/1991 | Wheetley .................... 408/1 R |
| 5,356,245 A | * | 10/1994 | Hosoi et al. .................... 408/56 |
| 5,559,713 A | * | 9/1996 | Brown et al. .................. 700/174 |
| 5,584,618 A | * | 12/1996 | Blankenship et al. ....... 408/1 R |
| 5,595,462 A | * | 1/1997 | Hensley ....................... 409/132 |
| 5,951,216 A | * | 9/1999 | Antoun ......................... 408/56 |
| 5,951,217 A | * | 9/1999 | Ostermeier et al. ........... 408/59 |
| 5,967,716 A | * | 10/1999 | Katsuzawa et al. .......... 409/134 |
| 6,776,562 B2 | * | 8/2004 | Morrison et al. .............. 408/56 |

(Continued)

FOREIGN PATENT DOCUMENTS

DE      29 12 396      10/1980

(Continued)

*Primary Examiner*—Daniel W Howell
(74) *Attorney, Agent, or Firm*—Antonelli, Terry, Stout & Kraus, LLP.

(57) ABSTRACT

A compact drilling system capable of improving working efficiency. The drilling system includes a drilling machine and a compressor. A control circuit controls performances of a drill motor in the drilling machine and an air compression motor in the compressor based on the detection result of a pressure sensor that detects a pressure within an air tank provided in the compressor. When one of the motors is activated, the other motor is not allowed to be operated and only when the drill motor is activated, compressed air is supplied from the air tank to the drilling machine. An electrical socket is provided in the compressor. A power cord extending from the drilling machine can be connected to the socket.

10 Claims, 4 Drawing Sheets

U.S. PATENT DOCUMENTS

| | | | |
|---|---|---|---|
| 6,783,309 B2 * | 8/2004 | Makiyama | 409/136 |
| 6,874,977 B2 * | 4/2005 | Cook et al. | 408/1 R |
| 2003/0133766 A1 * | 7/2003 | Makiyama | 409/136 |
| 2005/0105977 A1 * | 5/2005 | Ishihara | 408/1 R |

FOREIGN PATENT DOCUMENTS

| | | |
|---|---|---|
| DE | 29 33 084 | 3/1981 |
| DE | 198 60 182 | 7/2000 |
| EP | 0 252 611 | 1/1988 |
| EP | 1561547 A2 * | 8/2005 |
| JP | 62-201642 | 12/1987 |
| JP | 63260708 A * | 10/1988 |
| JP | 03038311 A * | 2/1991 |
| JP | 7-246614 | 9/1995 |
| JP | 2003-011114 | 1/2003 |
| JP | 2004-036487 | 2/2005 |
| JP | 2006088285 A * | 4/2006 |
| WO | WO 02/094527 | 11/2002 |

* cited by examiner

DRILLING SYSTEM INCLUDING DRILLING MACHINE AND COMPRESSOR

BACKGROUND OF THE INVENTION

The present invention relates to a drilling system including a drilling machine and a compressor to be connected to the drilling machine. The present invention also relates to a compressor used for a power tool such as the drilling machine.

A drilling machine for drilling holes into a structure such as a concrete wall or the like is known as disclosed in Laid-open Japanese Utility Model Application Publication No. S62-201642. The drilling machine disclosed in the JP publication includes a main body and a drill bit extending from the main body. The drill bit has a discharge port and an air passageway connected to the discharge port. The main body is also formed with an air passageway connected to the air passageway of the drill bit. The discharge port is formed in the vicinity of a cutting edge for ejecting compressed air from the cutting edge. The air passageway in the main body of the drill machine is connected to an air outlet port of a compressor, so that the compressed air is discharged into the main body and is ejected out of the discharge port of the drill bit. Accordingly, the drill bit as well as the drilled target are cooled, and cut-out concrete dust can be discharged out of a drilled hole.

In the conventional drilling system, the rotation of a motor for rotating the drill bit and delivery of the compressed air from the compressor are not linked with each other. Therefore, an operator of the machine must adjust an air-valve provided at the main body or at the compressor in order to deliver the compressed air. Thus complicating operation results. Further, compressed air may be discharged from the discharge port even under the condition that the drilling machine has not been started up. Thus, the compressed air has been consumed uselessly. To this effect, a large capacity compressor capable of generating greater amount of compressed air must be required taking the excessive consumption of the compressed air into consideration.

Further, in a construction site or the like in which the drilling machine is frequently used, a temporary power source is set up for allowing electric tools to be used. Since the electric power supplied from the temporary power source is lower than that supplied from a permanent power source, a frequent use of electric tools and the like that consume a large electric power may cause an overcurrent protector to be activated to render the temporary power source inoperative.

In the drilling system, each of the drilling machine and the compressor provides a driving unit requiring great amount of electric power. Thus, a simultaneous use of the drilling machine and compressor may cause the overcurrent protector to be activated to stop the supply of the power during drilling work. Further, if two driving units are operated at the same time, operational sound becomes noisy.

Further, in the case where the drilling system is used to drill holes for curtain wall anchors, holes are pierced in a sequential manner while the operator moves along the wall surface of a building. In such a case, the drilling system must also be moved. A large-sized compressor involves additional work when the compressor needs to be moved to lower workability.

Furthermore, if the drilling machine and the compressor are respectively connected to the temporary power source by means of respective power cords, a workable area is reduced to the length of the shorter power cord. Accordingly, the operator can work only the area dependent on the shorter power cord. In order to enlarge the workable area, a position of the temporary power source needs to be frequently changed. When the longer power cords are used, a workable area centered on one power source can be enlarged. However, cable handling becomes difficult to lower workability.

SUMMARY OF THE INVENTION

It is therefore, an object of the present invention to provide a compact drilling system capable of providing an improved working efficiency.

This and other objects of the present invention will be attained by an improved drilling system including a drilling machine, a compressor, a drill motor drive detection unit, and a control unit. The drilling machine includes an outer frame, a rotation shaft, and a drill motor. The outer frame defines a fluid chamber section and has a compressed fluid inlet section in communication with the fluid chamber section. The rotation shaft is rotatably supported by the outer frame and is formed with a fluid passageway in communication with the fluid chamber section. The rotation shaft has a front end to which a drilling tool is detachably attachable. The fluid passageway is opened at the front end. The drill motor is disposed in the outer frame and is drivingly connected to the rotation shaft for rotating the rotation shaft about its axis. The drilling tool has a front end provided with a cutting edge and is formed with a compressed fluid passage having one end opened to the front end for serving as a fluid ejection port and another end in communication with the fluid passageway when the drilling tool is attached to the rotation shaft. The compressor includes a compression unit, and a connection section. The compression unit generates and stores a compressed fluid. The connection section connects the compression unit to the fluid inlet section for introducing the generated compressed fluid into the rotation shaft. The drill motor drive detection unit detects a driving state of the drill motor. The control unit controls an amount of compressed fluid to be discharged from the compression unit based on the driving state of the drill motor detected by the drill motor drive detection unit.

In another aspect of the invention, there is provided a compressor including a fluid compression motor, a compressed fluid tank, a pressure detection unit, a fluid compression motor control unit, a discharge port section, and a socket. The fluid compression motor generates a compressed air. The compressed fluid tank accumulates therein the compressed fluid generated by the fluid compression motor. The pressure detection unit detects a pressure of compressed fluid accumulated in the compressed fluid tank. The fluid compression motor control unit controls the fluid compression motor based on the detection result of the pressure detection unit. The discharge port section discharges generated compressed fluid to outside. A power cord of an external power tool is electrically connectable to the socket for supplying an electric power to the power tool.

DETAILED DESCRIPTION OF THE PREFERRED EMBODIMENTS

A drilling system according to a first embodiment of the present invention will be described with reference to FIGS. 1 through 4. A drilling system 1 shown in FIG. 1 mainly includes a drilling machine 2 and a compressor 30. The drilling system 1 is used for drilling shallow holes in a concrete body or the like to which screws and the like are secured. Throughout the specification, a drilling direction will be referred to as a front direction.

Figure 2:
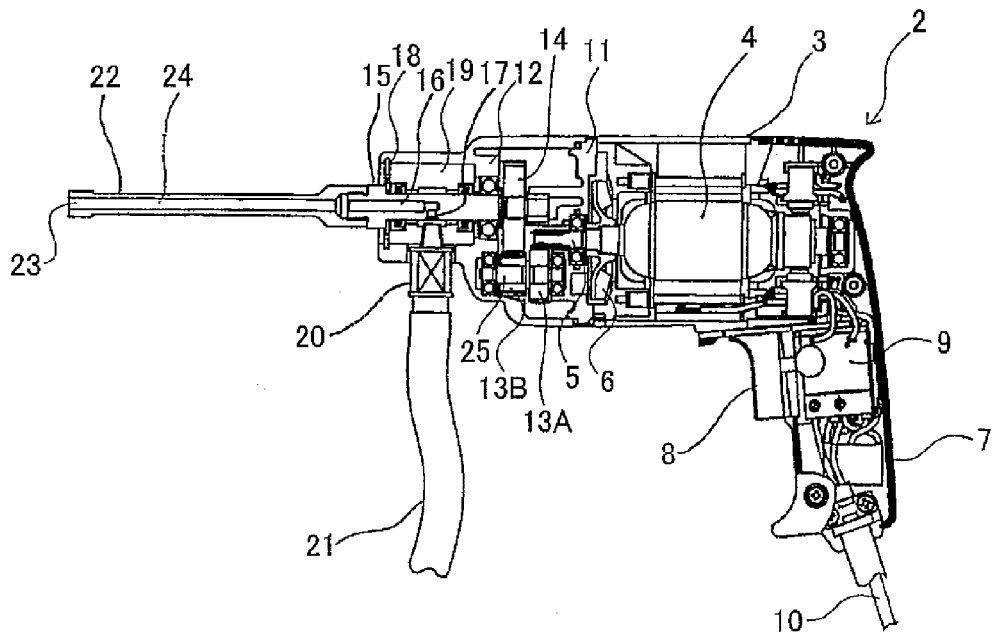
FIG. 2 is a cross-sectional view showing a drilling machine of the drilling system according to the embodiment.

The drilling machine 2 shown in FIG. 2 has a housing 3 serving as an outer frame. A drill bit 22 extends from a front end of the housing 3. A motor 4 serving as an engine for the drilling machine 2 is accommodated in the housing 3. An output shaft 5 extends in the front direction from the motor 4. A fan 6 for cooling the motor 4 is fixed to the output shaft 5. A handle 7 integrally extends from a lower portion of a rear end of the housing 3. The handle 7 is provided with a trigger 8, and a switching circuit 9 connected to the trigger 8 is disposed within the handle 7 for controlling the rotation of the motor 4 in response to the operation of the trigger 8. A power cord 10 connected to the switching circuit 9 extends from a lower end of the handle 7.

A first wall 11 is positioned in front of the motor 4 and within the housing 3 to rotatably support the output shaft 5. A second wall 12 is positioned in front of the first wall 11 and within the housing 3. A rotation shaft 15 extends through the second wall 12 and is rotatably supported by the second wall 12 through a bearing. The second wall 12 and the bearing maintain air-tight arrangement between front and rear sides of the second wall 12.

A first gear 13A, an intermediate gear 13B and a second gear 14 are disposed between the first and second walls 11 and 12. More specifically, an intermediate shaft 25 is rotatably supported by the first and second walls 11 and 12, and the first gear 13A and the second gear are concentrically fixed to the intermediate gear. The first gear 13A is meshedly engaged with the output shaft 5. The second gear 14 is concentrically fixed to the rear end portion of the rotation shaft 15, and is meshedly engaged with the intermediate gear 13B.

A third wall 18 is provided at the front end of the housing 3, and a front end portion of the rotation shaft 15 frontwardly extends through the third wall 18. The rotation shaft 15 is rotatably supported by the third wall 18 through a bearing. An airtight state is maintained between the front and rear sides of the third wall 18 and the bearing.

An air chamber 19 is defined by the housing 3, second wall 12, third wall 18 and output shaft 15. An air passageway 16 is coaxially extends through a front end portion of the rotation shaft 15, and is open at a front end face of the rotation shaft 15. A male screw is formed at an outer peripheral surface of the front end portion of the rotation shaft 15. An air hole 17 radially extends through the rotation shaft 15 for communication between an air chamber 19 and the air passageway 16. Thus, the air chamber 19 is in communication with the atmosphere only through the air hole 17 and air passageway 16.

A compressed air suction plug 20 is connected to the housing 3 at a position between the second wall 12 and third wall 18 to communicate with the air chamber 19. An air hose 21 is attached to the compressed air suction plug 20 for supplying a compressed air. Thus, the compressed air supplied via the air hose 21 is passed through the compressed air suction plug 20 and supplied into the air chamber 19. Then, the compressed air is passed through the air hole 17 and air passageway 16 and finally discharged to the atmosphere. The air hose 21 has a length shorter than that of the power cord 10.

The drill bit 22 has a front end provided with a diamond cutting edge, and has a rear end portion formed with a female screw threadably engagable with the male screw of the rotation shaft 15. An air passageway 24 is concentrically extends along an entire length of the drill bit 22. The front end of the air passageway 24 serves as a discharge port 23, and the rear end of the air passageway 24 is in communication with the air passageway 16 formed in the rotation shaft 15. Thus, the compressed air supplied from the air passageway 16 is ejected out of the discharge port 23.

The compressor 30 mainly includes a main body 31 and an air tank 32. The main body 31 accommodates therein a control circuit 33 including a microcomputer shown in FIG. 3. The air tank 32 stores compressed air. The compressor 30 can be easily hand-carried from one site to another in terms of its size and weight. The main body 31 includes a drill socket 37 to which the power cord 10 is connectable, a power switch 44 for the drilling machine 2, and a compressor power cord 43. An air discharge port 40 is formed at the main body 31. The air hose 21 is to be coupled to the air discharge port 40. An electromagnetic valve 38 (FIG. 3) is provided in the main body 31 to serve as a valve for the air discharge port 40. Further, an air compression motor 39 (FIG. 3) is disposed in the main body 31 for generating compressed air to be stored in the air tank 32.

Figure 3:
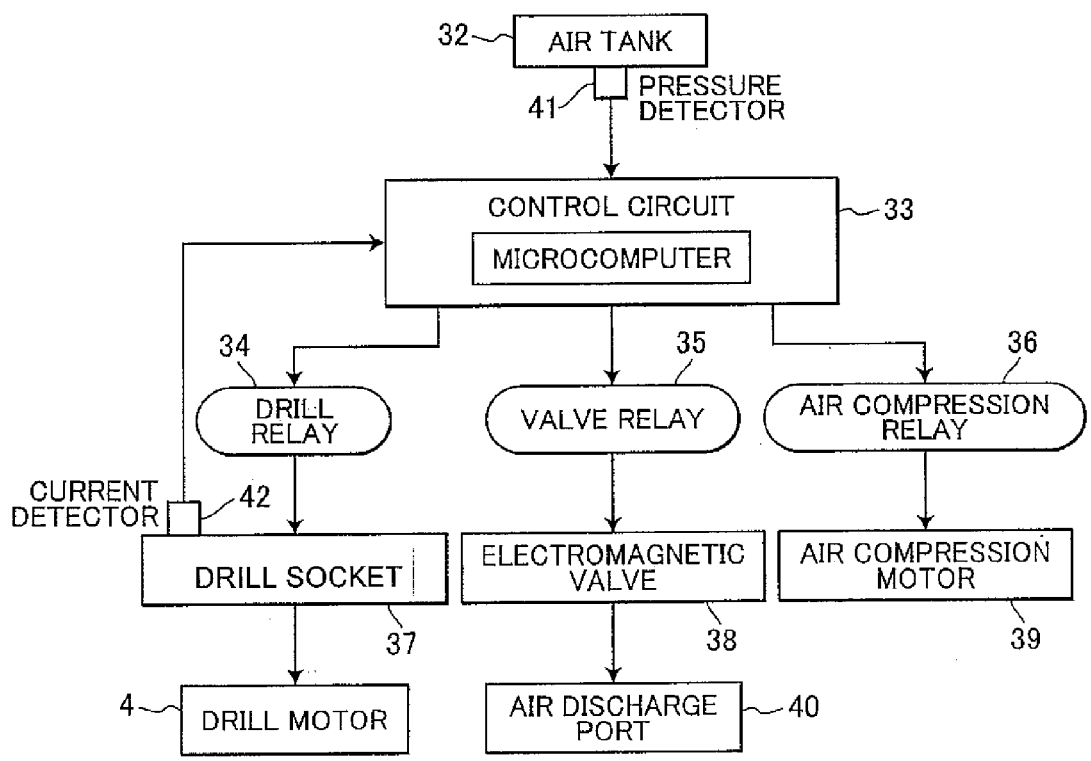
FIG. 3 is a block diagram showing a control system of the drilling system according to the embodiment.

As shown in FIG. 3, the air tank 32 is provided with a pressure sensor 41 for detecting a pneumatic pressure within the tank. The drill socket 37 is provided with a current detector 42 that detects a current. The above detection results are output to the control circuit 33.

The main body 31 further includes a drill relay 34, a valve relay 35 and an air compression relay 36, those connected to the control circuit 33. Thus, these relays 34, 35, 36 are controlled by the control circuit 33. The drill relay 34 is adapted to turn ON/OFF of the power supply to the drill motor 4 via the drill socket 37. The valve relay 35 is adapted to turn ON/OFF of the power supply to the electromagnetic valve 38. The air compression relay 36 is adapted to turn ON/OFF of the power supply to the air compression motor 39.

Figure 1:
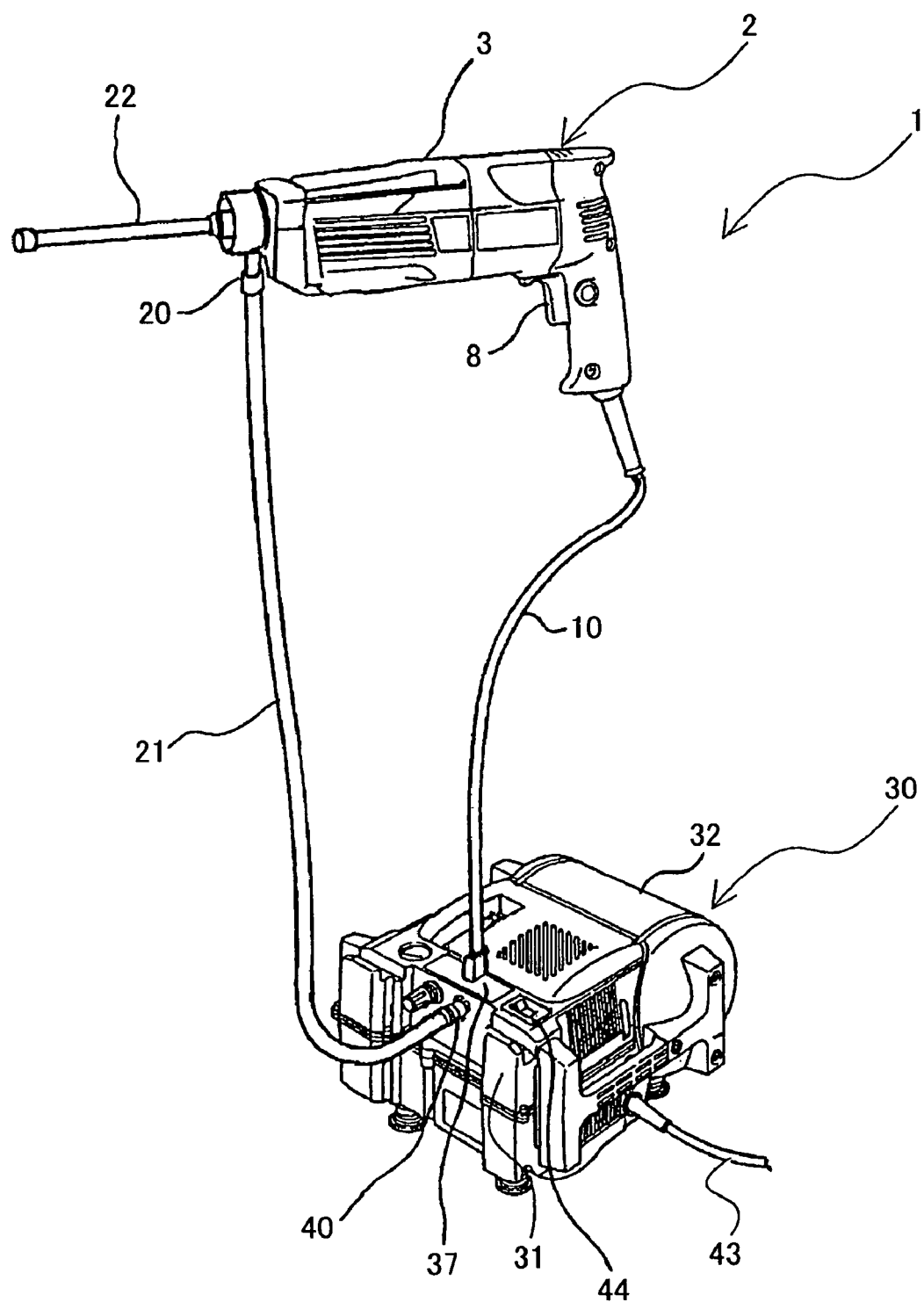
FIG. 1 is a perspective view showing an arrangement of a drilling system according to a first embodiment of the present invention.

In operation, the drilling operation is started with the condition shown in FIG. 1. That is, the power cord 10 of the drilling machine 2 is connected to the drill socket 37 of the compressor 30. The air hose 21 extending from the air discharge port 40 of the compressor 30 is connected to the compressed air suction plug 20 of the drilling machine 2. The compressor power cord 43 of the compressor 30 is connected to a power source (not shown). In this state, an operator can perform the drilling operation within an imaginary circle centered on a power source (not shown) and having a radius corresponding to the length of the compressor power cord 43 without a need of changing the power source. In addition, the operator can perform the drilling operation within an imaginary circle centered on the compressor 30 and having a radius corresponding to the length of the air hose 21 without moving the compressor 30. As a result, since the compressor 30 can be easily moved as described above, the operator can perform the drilling operation within a circle centered on the power source (not shown) and having a combined radius obtained by the length of the compressor power cord 43 plus the length of the air hose 21 without a need of changing the position of the power source.

The power switch 44 is turned ON in the state where the above-described connections are maintained. In this state, determination cannot be made whether compressed air has been stored in the air tank 32, so that determination whether the drilling operation that requires the compressed air is possible or not also cannot be made. Therefore, in the initial state, the drill relay 34, valve relay 35, and air compression relay 36 are all in OFF state so as to disable all works and operations.

A pressure within the air tank 32 is then detected by the pressure sensor 41. When the detected pressure is higher than a predetermined pressure, the drill relay 34 is turned ON. When the trigger 8 of the drilling machine 2 is pulled in this state, the drilling machine 2 can be activated. On the other hand, if the detected pressure is lower than the predetermined pressure, the air compression relay 36 is turned ON to activate the air compression motor 39. A pressure within the air tank 32 is detected by the pressure sensor 41 at predetermined time intervals even in the state where the air compression motor 39 is activated. When the detected pressure becomes higher than the predetermined pressure, the air compression relay 36 is turned OFF to stop the sion relay 36 is turned OFF to stop the air compression motor 39. Thereafter, the drill relay 34 is turned ON to allow the drilling machine 2 to be activated when the trigger 8 of the drilling machine 2 is pulled.

If the trigger 8 is pulled under the condition that the air compression relay 36 is in OFF state and the drill relay 34 is in ON state, the switching circuit 9 is turned ON to allow a current to flow into the drill motor 4, thereby activating the drilling machine 2. At this time, a current flow is detected by the current detector 42 provided at the drill socket 37. Based on the detection result, the control circuit 33 turns the valve relay 35 ON to allow a current to flow into the electromagnetic valve 38 to open the air discharge port 40. Thus, the compressed air in the air tank 32 is delivered to the air hose 21, so that the air can be discharged out of the discharge port 23 through air passageways 16 and 24.

A current flowing through the drill socket 37 is detected by the current detector 42 at predetermined time intervals even in the state where the drill motor 4 is activated. When the drill motor 4 is stopped and the current detector 42 detects that a current does not flow through the drill socket 37, the control circuit 33 turns the valve relay 35 OFF to stop the discharge of compressed air. Thereafter, a pressure within the air tank 32 is again detected by the pressure sensor 41. When the detected pressure is not greater than the predetermined pressure, the air compression relay 36 is turned ON after the drill relay 34 has been turned OFF, so that compressed air is stored in the air tank 32 by the air compression motor 39. At the time when a pressure within the air tank 32 becomes higher than the predetermined pressure, the air compression relay 36 is turned OFF. The drill relay 34 is then turned ON to start the drilling operation. By repeating the above process, the drilling operation can be performed continuously.

Figure 4:
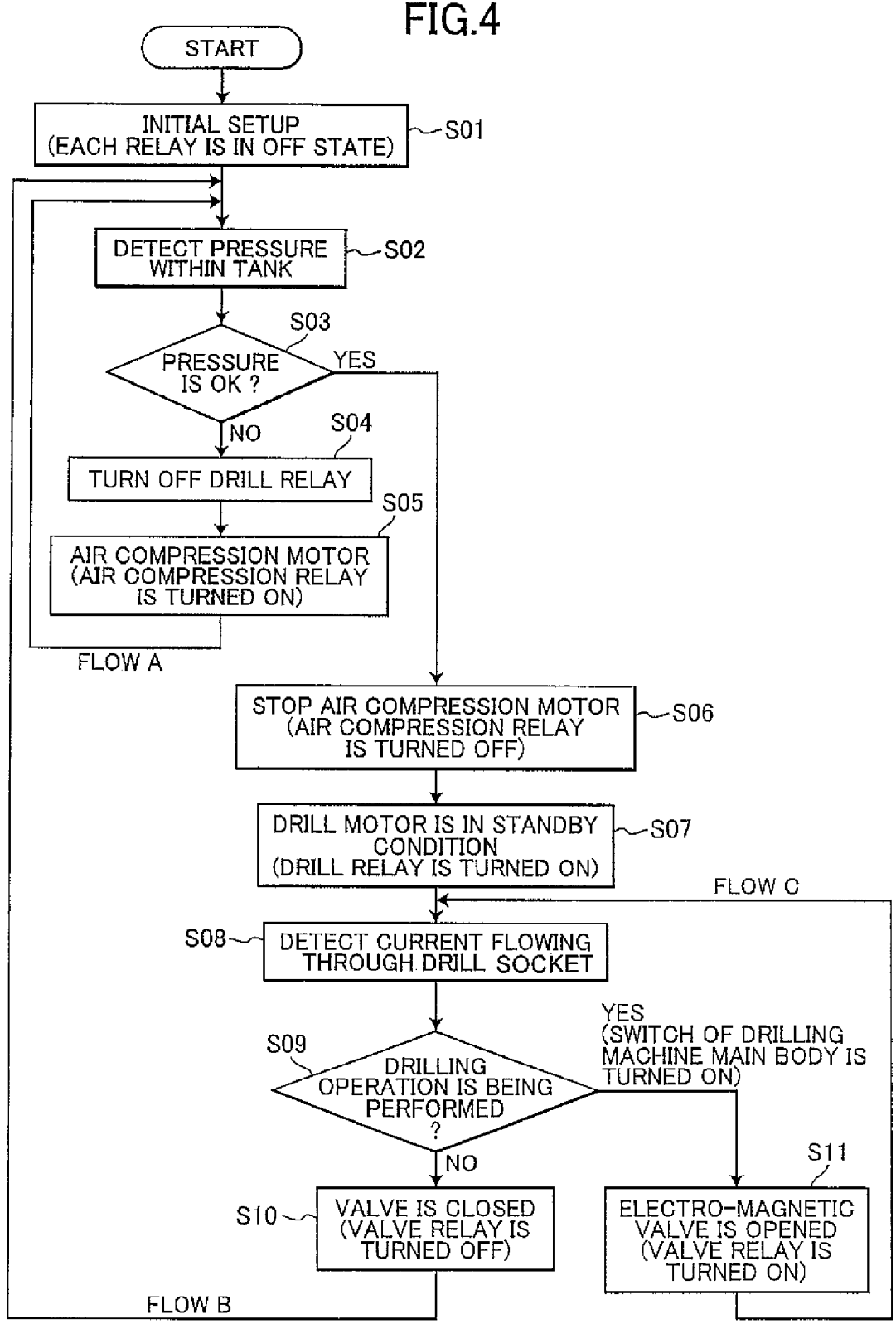
FIG. 4 is a flowchart showing an operational routine in the drilling system according to the embodiment.

The above process will be described based on a flowchart shown in FIG. 4. Firstly, the power switch 44 is turned ON as a starting condition. The routine then advances to S01. In S01, initial setting is performed, that is, confirmation is made that the drill relay 34, valve relay 35, and air compression relay 36 are all in OFF state. After the confirmation, the routine proceeds into S02 where a pressure within the air tank 32 is detected.

Based on the detection result in S02, determination is made in S03 whether the pressure within the air tank 32 is higher than the predetermined pressure. When it has been determined that the pressure is not more than the predetermined pressure (S03:No), the routine advances to S04. In S04, the drill relay 34 is turned OFF. At the start time, since all the relays have been turned OFF in S01, the drill relay 34 is maintained in OFF state without change. The air compression relay 36 is then turned ON in S05 to activate the air compression motor 39, thereby storing compressed air in the air tank 32. Thereafter, the routine returns to S02, where a pressure within the air tank 32 is again detected. A flow A including S02 to S05 is repeated until a pressure within the air tank 32 has become higher than the predetermined pressure.

In S03, when the pressure within the air tank 32 is determined to be higher than the predetermined pressure (S03:Yes), the routine advances to S06 where the air compression relay 36 is turned OFF to stop the air compression motor 39. After that, the routine advances to S07 where the drill relay 34 is turned ON to make the drill motor 4 ready for operation.

At the time when the drill motor 4 is in ready condition, the routine advances to S08, where a current flowing through the drill socket 37 is detected. Based on the detection result, determination is made in S09 whether a current flows or not, in other words, determination whether the drilling operation of the drilling machine 2 is being performed by the operator or not is made. When it has been determined that the drilling operation is being performed (S09:Yes), the routine advances to S11 where the valve relay 35 is turned ON to open the electromagnetic valve 38, so that the compressed air is discharged from the air discharge port 40 into the drilling machine 2. Thereafter, the routine returns to S08 where a current flowing through the drill socket 37 is again detected. While the drilling machine 2 is operated, a flow C including S08, S09, and S11 is repeated.

When the determination is made in S09 that the drilling operation is not being performed, that is, a current does not flow through the drill socket 37 (S09:No), the routine advances to S10 where the valve relay 35 is turned OFF. Thereafter, the routine returns to S02. In S02, a pressure within the air tank 32 is again detected. In S03, when the pressure within the air tank 32 is determined to be not greater than the predetermined pressure, the routine advances to S04, where the air compression relay 36 is turned ON after the drill relay 34 has been turned OFF. After that, the routine returns to S02. While the drilling machine 2 is not operated, a flow B including S02, S03, and S06 to S10 is repeated.

Figure 5:
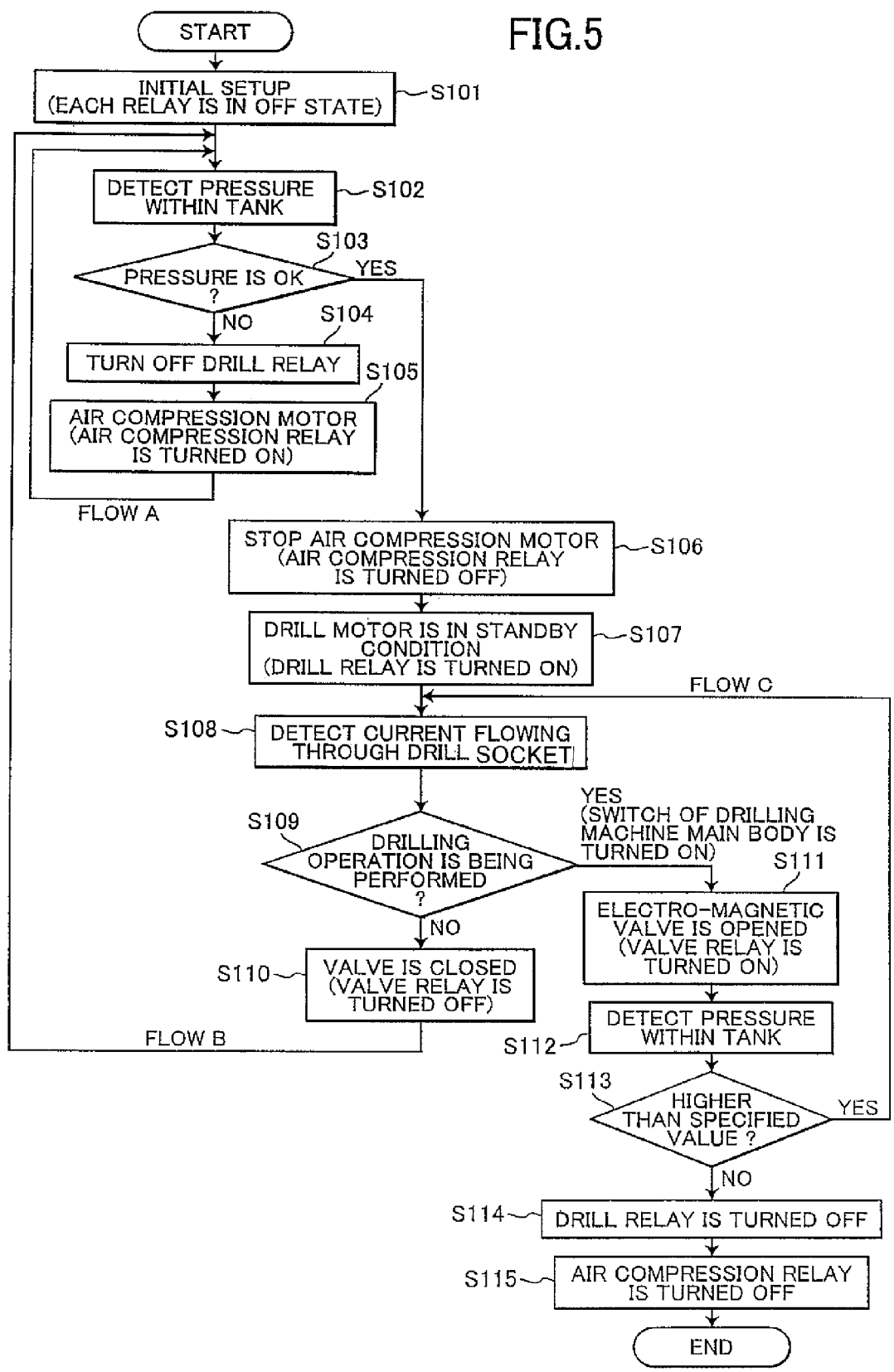
FIG. 5 is a flowchart showing another operational routine in a drilling system according to a second embodiment of the present invention.

A drilling system according to a second embodiment of the present invention will be described with reference to a flowchart shown in FIG. 5. The second embodiment is similar to the first embodiment in terms of a mechanical arrangement. An operational routine S1 through S11 is the same as that of S101 to S111 of the second embodiment. However, the second embodiment further includes steps S111 through S115 because of the following reason. Since deep hole drilling is not assumed in the drilling system 1 according to the above embodiment, the case where a pressure within the air tank 32 falls below the predetermined pressure during drilling operation is not paid attention to. Thus, as a modification to the first embodiment, the flowchart shown in FIG. 5 includes the case where a pressure within the air tank 32 falls below the predetermined pressure during drilling operation. In the flowchart of FIG. 5, since the routine from S101 to S111 is the same as the routine from S01 to S11 in the flowchart of FIG. 4, the description thereof will be omitted.

After the valve relay 35 has been turned ON in S111, a pressure within the air tank 32 is detected in S112. Based on the detection result, determination is made in S113 whether the pressure within the air tank 32 is greater than a specified value that is sufficient for cooling the drill bit 2. When the pressure within the air tank 32 is determined to be higher than the specified value (S113:Yes), the routine returns to S108. When the pressure within the air tank 32 is determined to be not greater than the specified value (S113:No), the routine advances to S114, where the drill relay 34 is turned OFF. After that, the routine advances to S115 where the air compression relay 36 is turned OFF to end the operation. If the drilling system 1 is to be operated again, the routine will be started from S101.

According to the above-described embodiments, compressed fluid can automatically be supplied from the compressor 30 to the drilling machine 2 only at the time when the drilling machine 2 is operated, and an amount of the compressed fluid to be supplied can be adjusted depending on the operational state of the drilling machine 2.

Further, since the drill motor 4 and air compression motor 39, which are the driving units that consume the most electric power, are not operated simultaneously, maximum electric power consumption can be reduced, and reduced noise generation can result.

Further, the compressed air is not wastefully consumed in the compressor 30, a satisfactory cooling effect can be expected in spite of an employment of a compact compressor.

While the invention has been described in detail and with reference to specific embodiments thereof, it would be apparent to those skilled in the art that various changes and modifications may be made therein without departing from the spirit and scope of the invention. For example, in the above-described embodiments, whether the drilling machine 2 is running or not is confirmed by detection to the current flowing through the drill socket 37. Alternatively, however, the operation of the drilling machine 2 may be confirmed based on a voltage change, vibration of the drilling machine 2, noise or the like.

What is claimed is:

1. A drilling system comprising:
    a drilling machine comprising;
        an outer frame defining a fluid chamber section and having a compressed fluid inlet section in communication with fluid chamber section;
        a rotation shaft rotatably supported by the outer frame and formed with a fluid passageway in communication with the fluid chamber section, the rotation shaft having a front end to which a drilling tool is detachably attachable, the fluid passageway being opened at the front end, the rotation shaft having an axis; and
        a drill motor disposed in the outer frame and drivingly connected to the rotation shaft for rotating the rotation shaft about the axis, the drilling tool having a front end provided with a cutting edge and formed with a compressed fluid passage having one end opened to the front end for serving as a fluid ejection port and another end in communication with the fluid passageway when the drilling tool is attached to the rotation shaft;
    a compressor comprising:
        a compression unit that generates and stores a compressed fluid; and
        a connection section that connects the compression unit to the fluid inlet section for introducing the generated compressed fluid into the rotation shaft;
    a drill motor drive detection unit that detects a driving state of the drill motor; and
        a control unit that controls an amount of compressed fluid to be discharged from the compression unit based on the driving state of the drill motor detected by the drill motor drive detection unit;
    wherein the compression unit comprises:
    a fluid compression motor;
    a compressed fluid tank accumulating therein a compressed fluid generated by the fluid compression motor; and,
    a pressure detection unit that detects a pressure of stored compressed fluid, and the drilling system further comprising:
    a fluid compression motor control unit that controls a rotation of the fluid compression motor based on a pressure of compressed fluid detected by the pressure detection unit; and
    a drill motor control unit that controls a rotation of the drill motor based on a pressure of compressed fluid detected by the pressure detection unit.

2. The drilling system as claimed in claim 1, wherein the compressor further comprises an electric power supply unit that supplies electric power to the drill motor.

3. The drilling system as claimed in claim 2, wherein the drilling machine further comprises a drill code extending from the outer frame; and
    wherein the electric power supply unit comprises a drill socket to which the drill code is connectable.

4. The drilling system as claimed in claim 3, wherein the compressor further comprises a compressor power code extending from the compression unit for electrical connection to an external power source.

5. The drilling system as claimed in claim 2, wherein the control unit comprises:
    means for determining a pressure in the compressed fluid tank;
    means for deactivating the drill motor when the determining means determines that the pressure in the compressed fluid tank is lower than a predetermined pressure; and
    means for activating the fluid compression motor after the deactivating means deactivates the drill motor.

6. The drilling system as claimed in claim 5, wherein the control unit further comprises:
    means for stopping rotation of the fluid compression motor when the determining means determines that the pressure in the compressed fluid tank exceeds the predetermined pressure; and
    means for making the drill motor in its standby state after the stopping means stops rotation of the fluid compression motor.

7. The drilling system as claimed in claim 6, wherein the connection section comprises a compressed fluid discharge port section, and a valve mechanism for selectively shutting off the fluid discharge port section; and
    wherein the control unit further comprises:
    means for judging drilling state or non-drilling state; and
    means for shutting off the valve mechanism if the judging means judges the non-drilling state.

8. The drilling system as claimed in claim 7, wherein the control unit further comprises:
    means for opening the valve mechanism if the judging means judges the drilling state.

9. The drilling system as claimed in claim 8, wherein the control unit further comprises:
    second means for determining a pressure in the compressed fluid tank;
    second means for deactivating the drill motor when the second determining means determines that the pressure is lower than a second predetermined pressure; and
    means for deactivating the compressed fluid motor, after the second deactivating means deactivates the drill motor.

10. The drilling system as claimed in claim 1, wherein the drill motor drive detection unit and the control unit are disposed at the compressor.

* * * * *